United States Patent [19]

Fagan

[11] 4,390,117
[45] Jun. 28, 1983

[54] LADDER RACK FOR VEHICLE

[76] Inventor: Michael W. Fagan, Mountain View, Kilkerly, Dundalk, County Louth, Ireland

[21] Appl. No.: 278,346

[22] Filed: Jun. 29, 1981

[30] Foreign Application Priority Data

Jun. 30, 1980 [IE] Ireland .................................. 1375/80
Mar. 26, 1981 [IE] Ireland .................................. 683/81

[51] Int. Cl.³ ............................................. B60R 9/04
[52] U.S. Cl. .................................. 224/310; 182/127; 211/13; 224/324; 248/503
[58] Field of Search ............... 224/310, 315, 309, 324, 224/317, 323, 325, 329, 331; 414/529, 530; 248/225.3, 316; 182/127; 211/8, 89, 120, 124, 13

[56] References Cited

U.S. PATENT DOCUMENTS

| | | | |
|---|---|---|---|
| 2,859,887 | 11/1958 | Haight | 224/310 |
| 3,722,766 | 3/1973 | Barrineau et al. | 224/324 |
| 3,888,398 | 6/1975 | Payne | 224/323 X |
| 4,170,331 | 10/1979 | Faulstich | 224/324 |
| 4,262,834 | 4/1981 | Nutt | 224/324 |

FOREIGN PATENT DOCUMENTS

| | | | |
|---|---|---|---|
| 800941 | 11/1950 | Fed. Rep. of Germany | 224/324 |
| 2449000 | 9/1980 | France | 224/309 |

Primary Examiner—Allan N. Shoap
Assistant Examiner—Robert Petrik
Attorney, Agent, or Firm—Birch, Stewart, Kolasch & Birch

[57] ABSTRACT

A ladder rack for a vehicle roof comprises a sub-frame having clamps for releasable attachment to the roof of a vehicle. The sub-frame carries front and rear ladder support assemblies each comprising transverse rollers for engaging the stringers of a ladder spanning the two assemblies. Each support assembly further comprises a respective ladder-retaining member manually pivotable about a transverse axis from a lowered inoperative position to a raised rung-engaging position. The front and rear ladder-retaining members are operated by a handle or handles pivoted at one side of the rear support assembly, either independently or simultaneously. Furthermore, the rollers of the front support assembly are mounted to be manually raised and lowered. A ladder spanning the assemblies may be brought into a downwardly and rearwardly inclined orientation for off-loading from the rear of the vehicle. The manual operation of the front rollers is independent of the manual operation of at least the rear ladder-retaining member, so that a ladder may be brought to the inclined position in preparation for unloading while still being retained on the rack by the rear ladder-retaining member.

9 Claims, 12 Drawing Figures

LADDER RACK FOR VEHICLE

BACKGROUND OF THE INVENTION

This invention relates to a vehicle roof rack, in particular to a vehicle roof rack adapted for the transportation of ladders.

Accordingly, the present invention provides a ladder rack for a vehicle roof comprising a sub-frame having means for releasable attachment to the roof of a vehicle, and front and rear ladder support assemblies mounted on the sub-frame, each support assembly comprising at least on transverse roller for engaging the stringers of a ladder spanning the two assemblies, and at least one support assembly further comprising at least one ladder-retaining member pivotable about a transverse axis from a lowered inoperative position to a raised operative position wherein the said member engages a rung of a ladder spanning the two assemblies, the rear assembly further comprising a handle pivotally mounted at one side thereof which is coupled to the ladder-retaining member to effect the said raising and lowering of the latter.

BRIEF DESCRIPTION OF THE DRAWINGS

The invention will be understood from the following description of embodiments thereof, given by way of example only, with reference to the accompanying drawings, in which.

DETAILED DESCRIPTION OF THE INVENTION

Figure 12:
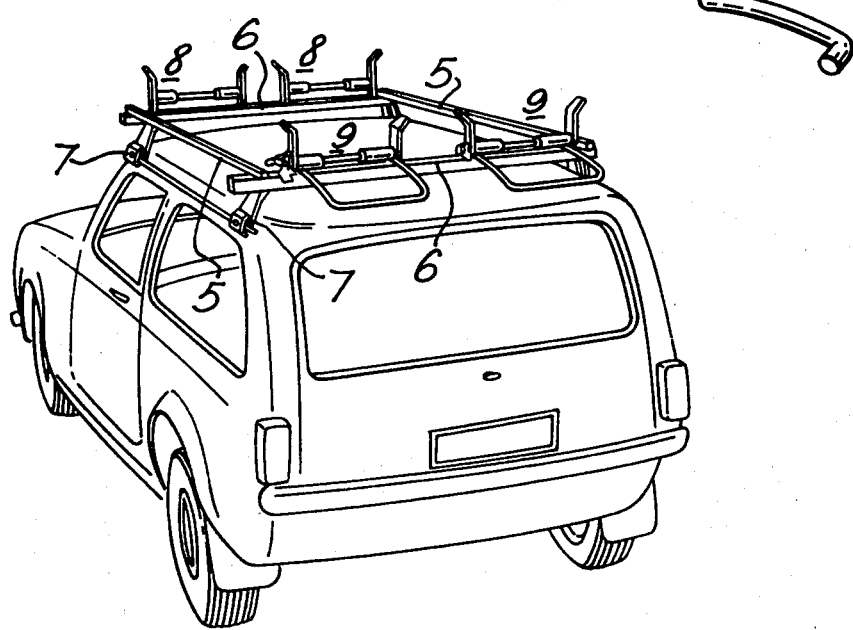
FIG. 12 shows the third embodiment mounted on the roof of a hatchback vehicle.

Referring first to FIGS. 1 to 5 of the drawings, a ladder rack for a vehicle roof comprises a sub-frame of rectangular form comprising longitudinal side members 5 rigidly secured to transverse cross-members 6. The sub-frame comprises four clamps 7 by which the sub-frame is releasably attached to a vehicle roof in a conventional manner. This is shown in FIG. 12 for the third embodiment to be described below—however the sub-frame is substantially the same for each embodiment and the manner of fixing to the vehicle roof is the same.

A pair of front ladder support assemblies 8 are mounted on the front cross-member 6 of the sub-frame, and a pair of rear ladder support assemblies 9 are mounted on the rear cross-member. Each front assembly 8 is longitudinally aligned with a respective rear assembly 9 and together with the latter forms a support for a single ladder spanning the two assemblies. Thus the embodiment illustrated provides accommodation for two ladders side-by-side; however this is not essential and if desired a single front assembly 8 and a single rear assembly 9 may be provided. Since each pair of assemblies 8 and 9 are of identical construction only the rearside pair will be described in detail in this and the succeeding embodiments.

The front support assembly 8 comprises a mild steel frame 10 which rotatably carries a transverse shaft 11 upon which are freely mounted two roller arms 12 and 13. The latter in turn have a transverse shaft 14 mounted between the free ends thereof, the shaft 14 carrying rollers 15 and 16. The shaft 11 has rigidly secured thereon two ladder-retaining bars 19 and 20.

The rear support assembly 9 has a mild steel frame 21 rotatably carrying a transverse shaft 22 with roller arms 23 and 24 which carry rollers 25 and 25. In this case however, the roller arms 23,24 are fixed rigidly to the base of the frame 21 with the shaft 22 passing freely through them, and each roller 25 and 26 is rotatably mounted between one end of the frame 21 and a respective arm 23 and 24. The shaft 22 also has rigidly secured thereto two ladder-retaining bars 27 and 28.

Figure 3:
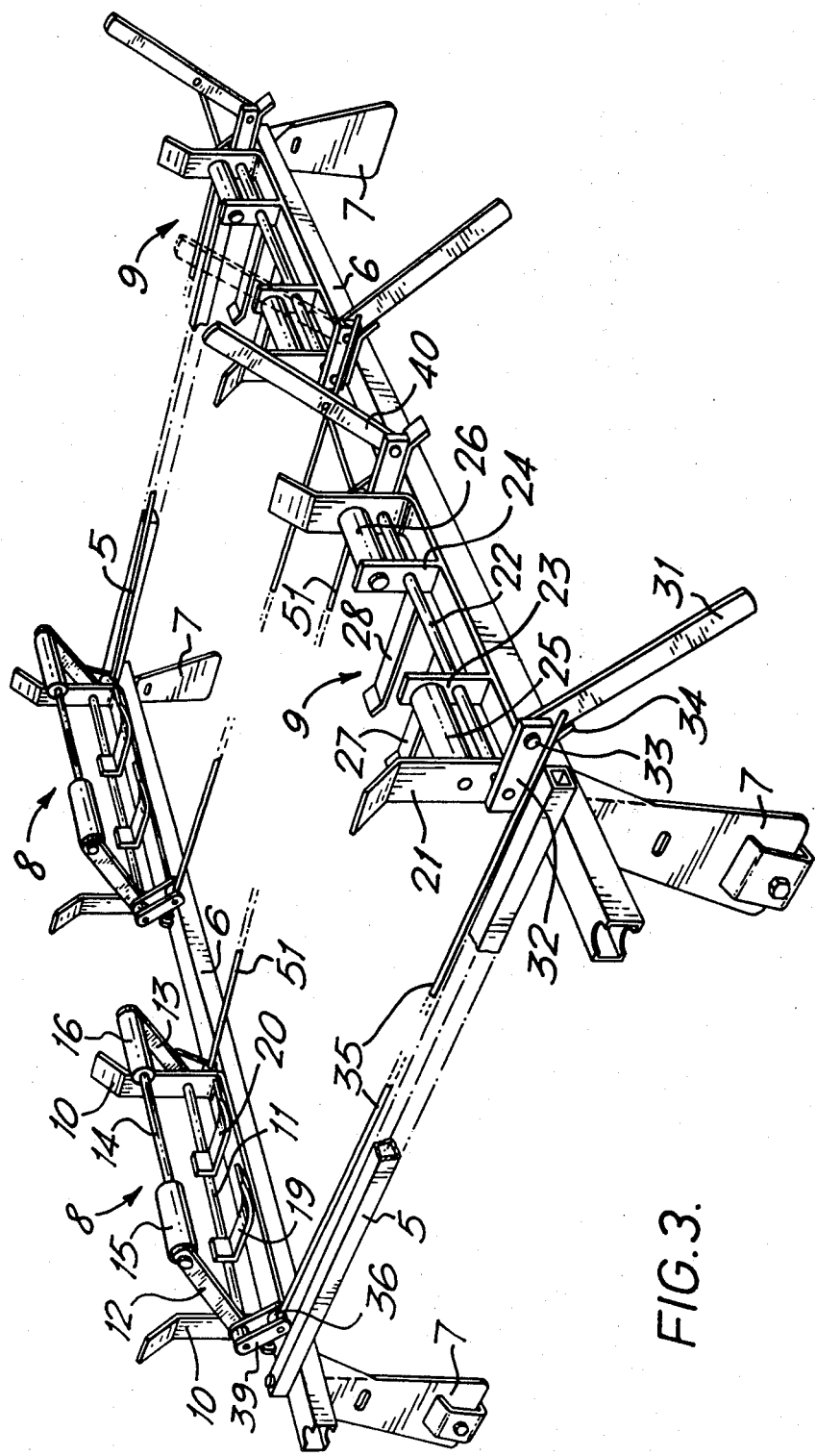
FIG. 3 is a perspective view of the first embodiment in the unlocked position ready for unloading.
Figure 5:
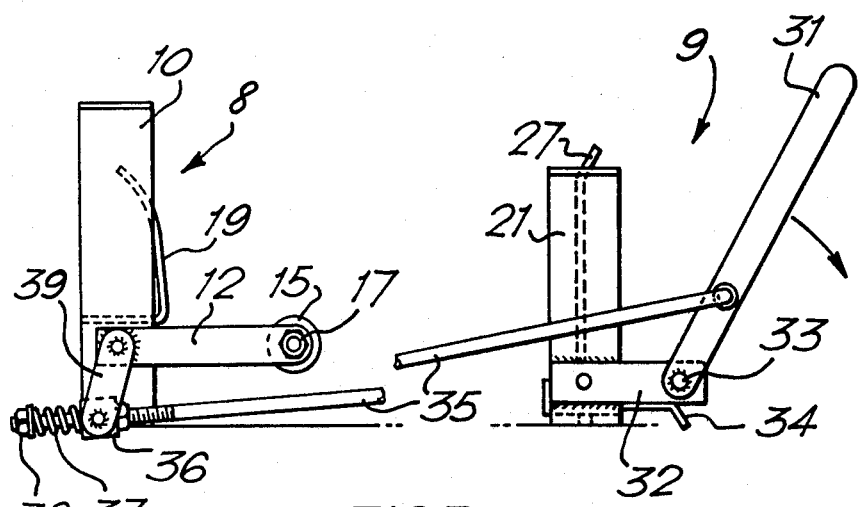
FIG. 5 is a side view of the mechanism for raising and lowering the front rollers of FIG. 1 to 3.

The rear assembly 9 carries on one side thereof a first handle 31 which is pivotally mounted on a bracket plate 32 secured to the frame 21 (see FIGS. 3 and 5). The handle 31 pivots about the point 33 and has a stop plate 34 also secured to the frame 21. Intermediate the length of the handle 31 is pivotally connected a rod 35 which passes at its other end through a housing 36 provided with a spring 37, the rod 35 being secured by a lock nut 38. The housing 36 is pivotally secured between two plates 39, which are in turn rigidly secured to the roller arm 12 of the front assembly 8. In use a clockwise depression of the handle 31 to engage the stop plate 34 causes the rod 35 to be pulled rearward imparting, through the housing 36 and the plates 39, an anti-clockwise pivotal movement to the roller arm 12 to raise the rollers 15 and 16 to an elevated position. In this position the handle is overcentre and is thus held locked in position by the spring 37. The rollers 25 and 26 of the rear rack are not connected to the lifting handle 31 and are not adapted to be raised.

Figure 1:
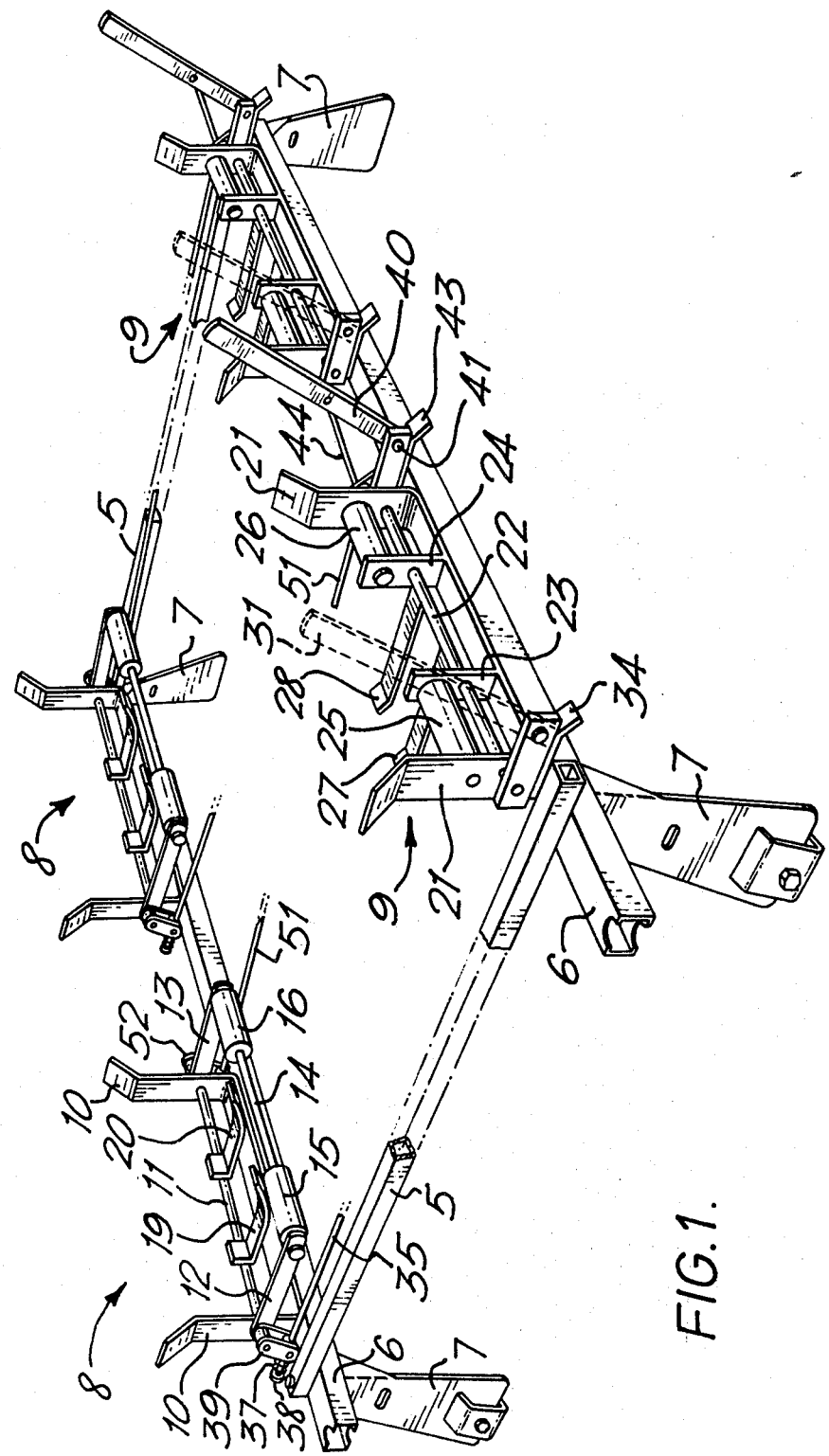
FIG. 1 is a perspective view of a first embodiment of the invention in the unlocked position ready for loading.
Figure 4:
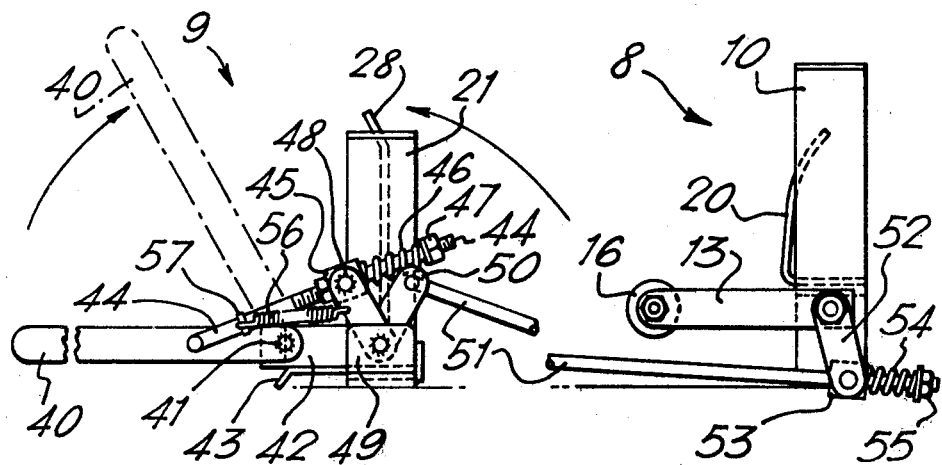
FIG. 4 is a side view of the mechanism for raising and lowering the ladder-retaining members of FIGS. 1 to 3.

The rear assembly 9 is also provided with a second handle 40, on the opposite side to the handle 31, and this handle 40 is operatively associated with the bars 19, 20, 27 and 28 (see FIGS. 1 and 4). The handle 40 is pivotally mounted at 41 to a bracket 42 secured to the frame 21 and has a stop plate 43 also secured to the frame 21. Intermediate the length of the handle 40 there is connected a rod 44, which passes through a housing 45 having a spring 46 bearing against a locknut 47 which retains the rod 44 in position. The housing 45 is pivotally mounted between two plates 48 which are rigidly secured to the shaft 22 between the bracket 42 and a further bracket 49 secured to the frame 21. The plates 48 are rigidly secured to a second plate 50—the longitudinal axes of the plates 48, 50 defining a contained angle of 60°. The plate 50 has pivotally connected to the free end thereof a rod 51 which, in a similar manner as the rod 35, is connected to two plates 52 through a housing 53 with a spring 54 and a lock nut 55 for securing the connection of the rod 51. The plates 52 are rigidly secured to the shaft 11 of the front assembly. In use the handle 40 is pulled down to engage the stop plate 43, which causes the rod 44 to rotate the plates 48 and 50 to directly pivot the bars 27, 28 into an upright operative position and, indirectly through the rod 51, housing 53 and plates 52, pivot the bars 19, 20 also into an upright operative position. In addition, when the handle 40 engages the stop plate 43 the handle is overcentre and is held in this locked position under the influence of a spring 56 connected at 57 to the rod 44 and to the outer one of the plates 48.

Figure 2:
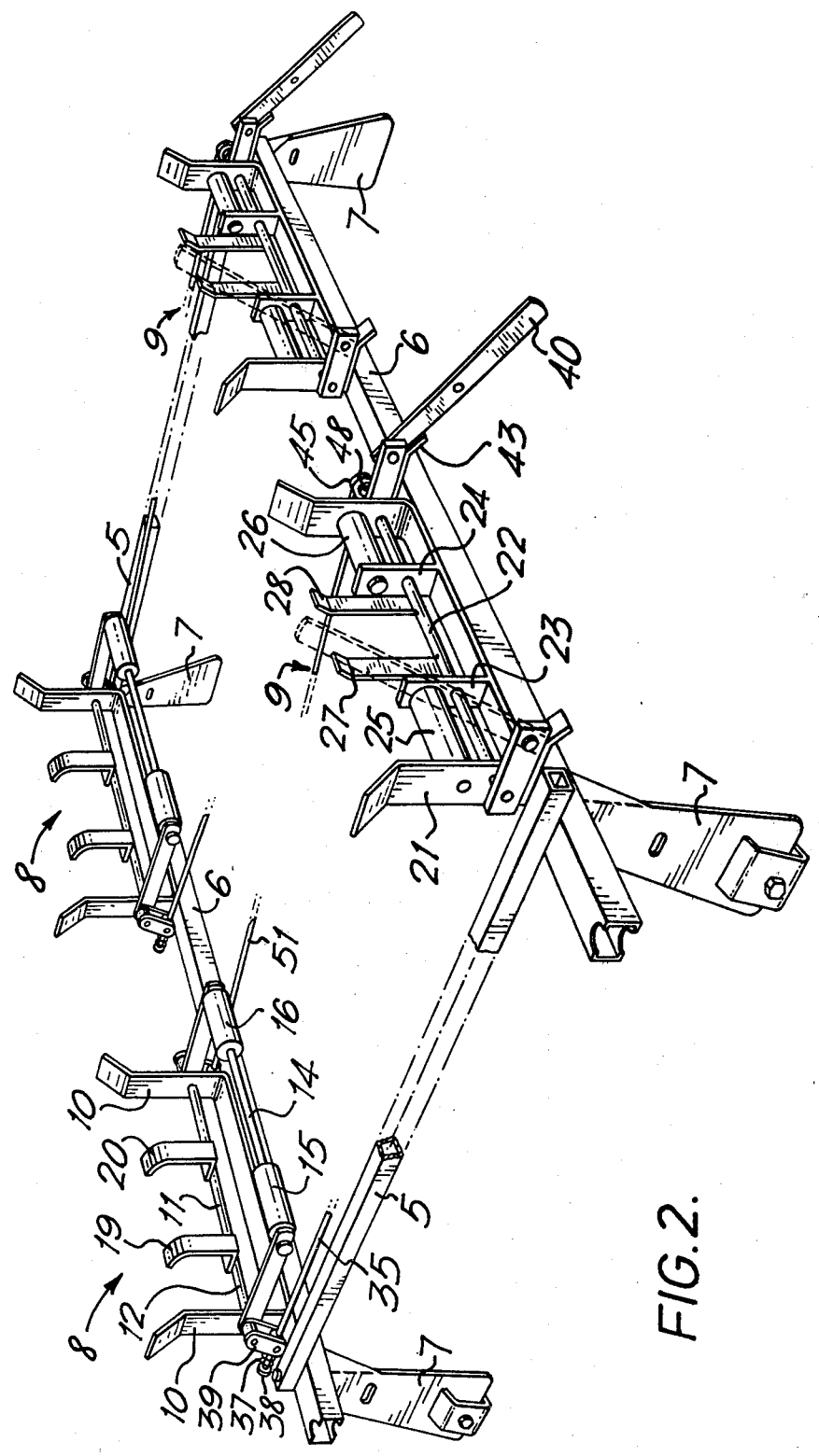
FIG. 2 is a perspective view of the first embodiment in the locked position.

The above ladder rack operates as follows. In the unlocked position ready for loading (FIG. 1) the rollers 15 and 16 are in the lowered position, at substantially the same level as the fixed rollers 25 and 26, and all four ladder-retaining bars 19, 20, 27 and 28 are in their lowered inoperative positions. In this position of the rack a ladder is run along the rollers 15, 16, 25, 26 from the rear, the rollers engaging the stringers (uprights) of the ladder. When the ladder is in a satisfactory position bridging fully the front and rear assemblies 8 and 9, the handle 40 is pulled down to raise the bars 19, 20, 27 and 28 simultaneously to the upright position between rungs of the ladder to engage the said rungs and thereby lock the ladder into position on the roof rack (FIG. 2). Since the rung spacing will not in general be the same as the spacing between the front and rear pairs of ladder-retaining bars the latter resiliently press in opposite directions on the rungs by compression of the springs 46 and 54.

When one wishes to unload a ladder from the roof rack the handle 40 is pressed upwardly to pivot the bars 19, 20, 27 and 28 to their lowered inoperative positions. The handle 31, on the other side of the rear assembly 9 to the handle 40, is then pulled down to pivot the rollers 15 and 16 with the ladder thereon to a raised position (FIG. 3). This brings the ladder on the roof rack into a rearwardly downwardly inclined position from which it may be easily lowered rearwardly from the roof rack to the ground. When the ladder has been removed from the roof rack, the handle 31 is raised upwardly to return the rollers 15 and 16 to the lowered position (FIG. 1).

The materials used in the construction of the roof rack are preferably mild steel for all metal parts and for the rollers preferably a hard rubber outer surface on a steel sleeve. The metal components of the roof rack are preferably painted to match the colour scheme of the vehicle e.g. the van, with which the roof rack is used.

Figure 6:
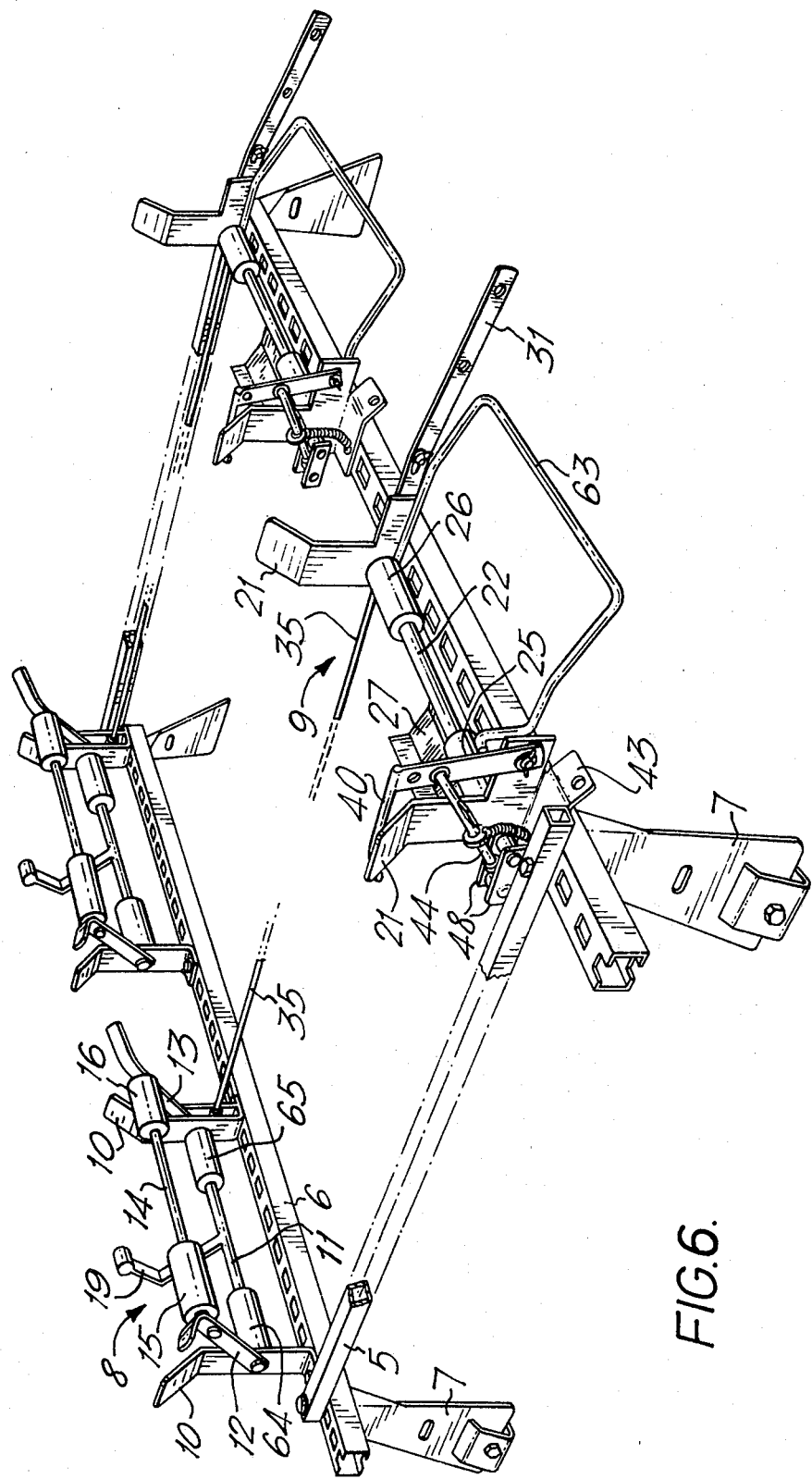
FIG. 6 is a perspective view of a second embodiment of the invention in the unlocked position ready for loading and unloading.
Figure 7:
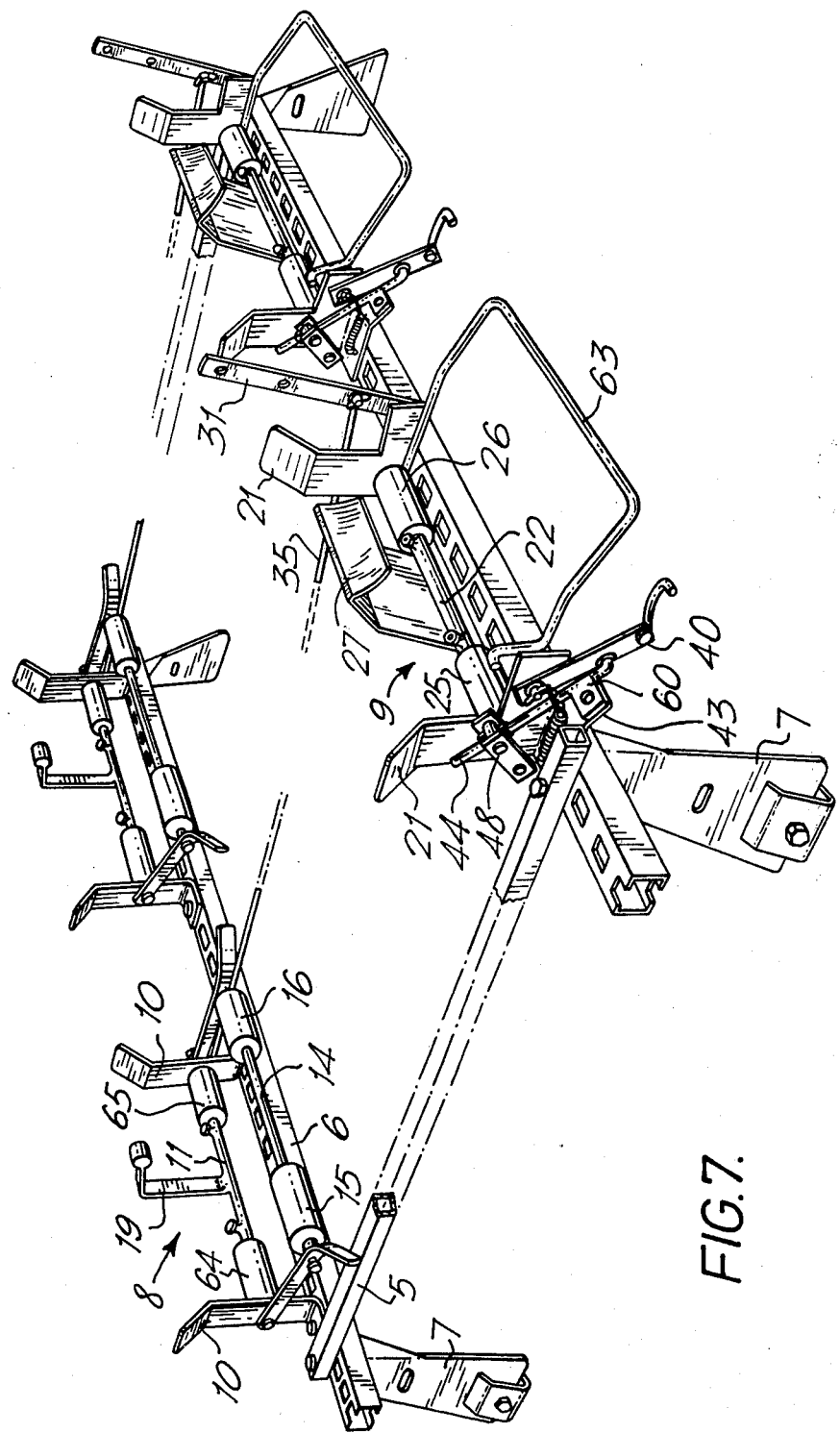
FIG. 7 is a perspective view of the second embodiment in the locked position.

A second embodiment of the invention is shown in FIGS. 6 and 7, in which the same reference numerals have been used for components which perform the same or a similar function as components of the first embodiment.

Disregarding differences in design detail, which will be described later, the main differences between this and the first embodiment are firstly that the handle 40 (which has now been moved to the rearside of the rear assembly 9) operates only on the shaft 22 to raise and lower a single hook-form ladder-retaining plate 27 rigidly secured thereto, so that the components 50 to 55 of the first embodiment are omitted, and secondly that the handle 31 (which has been moved to the offside of the rear assembly) operates not only to raise and lower the rollers 15 and 16 but also operates to raise and lower a single right-angle ladder-retaining bar 19 welded to the shaft 11, the bar 19 being raised when the rollers 15 and 16 are lowered and vice versa.

Figure 10:
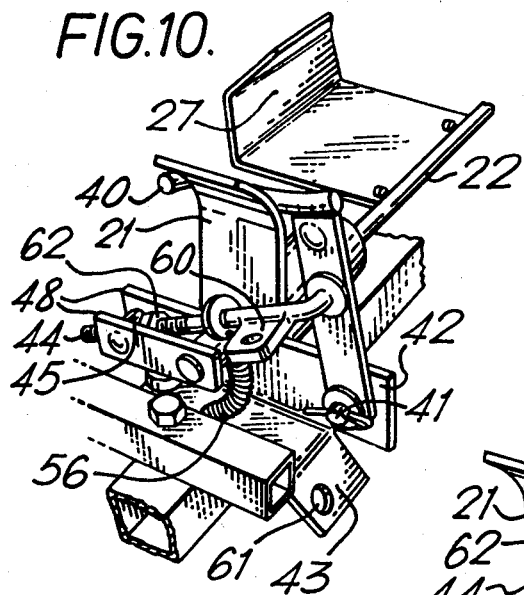
FIG. 10 is a perspective view of the mechanism for raising and lowering the rear ladder-retaining member of FIGS. 6 to 9 in the unlocked position.
Figure 11:
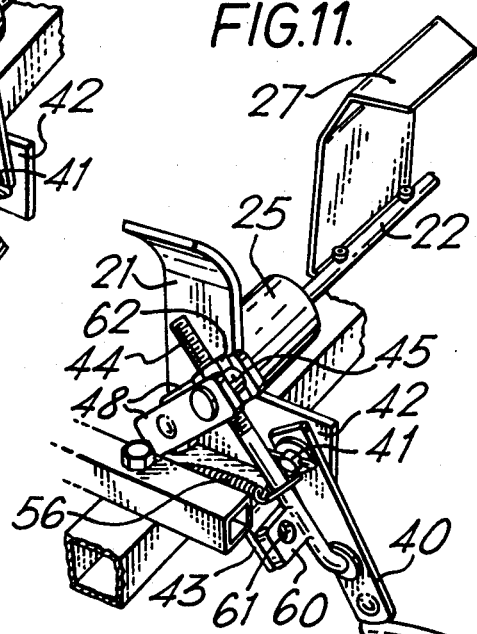
FIG. 11 is a perspective view of the mechanism of FIG. 10 in the locked position.

Turning now to differences in design detail and referring also to FIGS. 10 and 11, the rollers 25 and 26 of the rear assembly 9 are now freely mounted directly on the shaft 22 on opposite sides of the single hook-form plate 27 which is bolted to the shaft 22 as shown. The handle 40 is of right-angle design for compactness and does not engage the stop plate 43 directly. Instead, the stop function is performed by a plate 60 welded to the rod 44, the plate 43 and 60 having co-operating holes 61 for a padlock. As before the plates 48 are rigidly secured to the shaft 22, but the spring 56 is connected between the rod 44 and the sub-frame rather than between the rod 44 and outer plate 48. However, the overcentering action is the same with the handle 40 being locked in the down position (FIG. 11). The hook shape of the plate 27 is designed to give clearance over a rung of the ladder when the handle 40 is pushed down, and in the final part of its motion to actually hook over the rung and grip the latter. Since this design does not depend upon a resilient pressure against the rung to retain the ladder in position the spring 46 of the first embodiment is omitted and the rod 44 is held at a fixed position in the housing 45 by two nuts 62 on opposite sides thereof. The rear support assembly is also provided with a protective bumper 63 which protects the rear of the vehicle when a ladder is being loaded or unloaded—see also FIG. 12.

Regarding the front support assembly 8, the roller support arms 12 and 13 are rigidly secured to the shaft 11 so that the right-angle bar 19, the arms 12 and 13, and the rollers 15 and 16 on their shaft 14 form a single rigid assembly pivoting about the axis of the shaft 11. Such pivoting is effected, as before, by a handle 31 via a connecting rod 35. It is to be noted that the front assembly comprises a second pair of rollers 65,65 freely mounted on the shaft 11, similar to the rollers 25 and 26 on the shaft 22.

FIG. 6 shows the unlocked position of the roof rack for the loading and unloading of a ladder. In this position the handle 40 is in the upper position so that the plate 27 is in its lowered inoperative position. The handle 31, on the other hand, is in its lower position so that the front rollers 15 and 16 are raised about the level of the bar 19 which is thus in its lowered inoperative position. A ladder may now be run onto the assemblies from the rear, running on the rollers 25,26 and 15,16. To lock the ladder in position the handle 40 is pulled down and the handle 31 pushed up (FIG. 7). The hooked plate 27 is raised to its operative position and thereby engages over a rung of the ladder, and the rollers 15 and 16 are lowered to bring the front bar 19 into its raised operative position between two adjacent rungs of the ladder with the free end of the bar extending over one of the rungs. In this position the front end of the ladder rests on the rollers 64 and 65.

Figure 8:
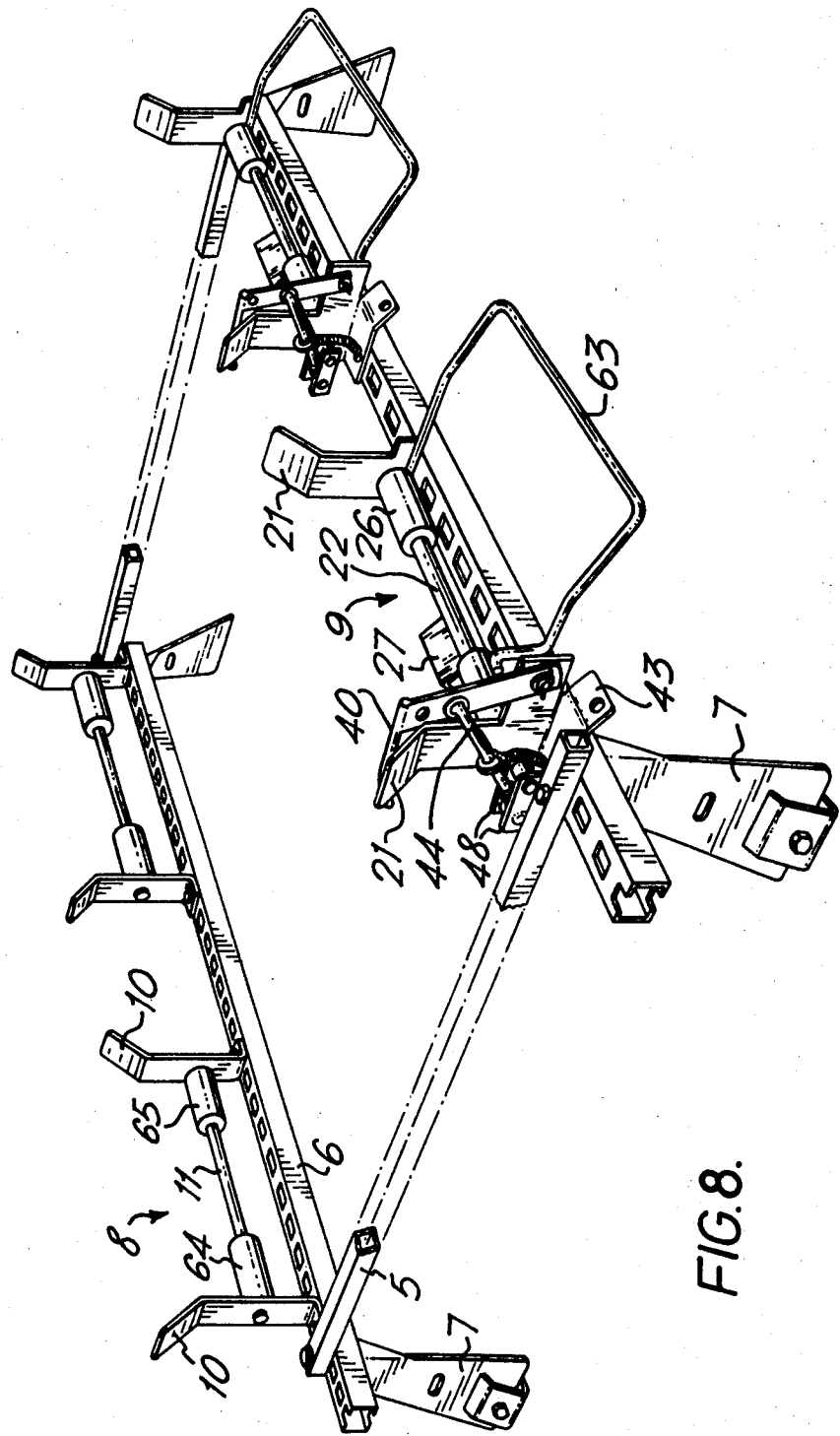
FIG. 8 is a perspective view of a third embodiment of the invention in the unlocked position.
Figure 9:
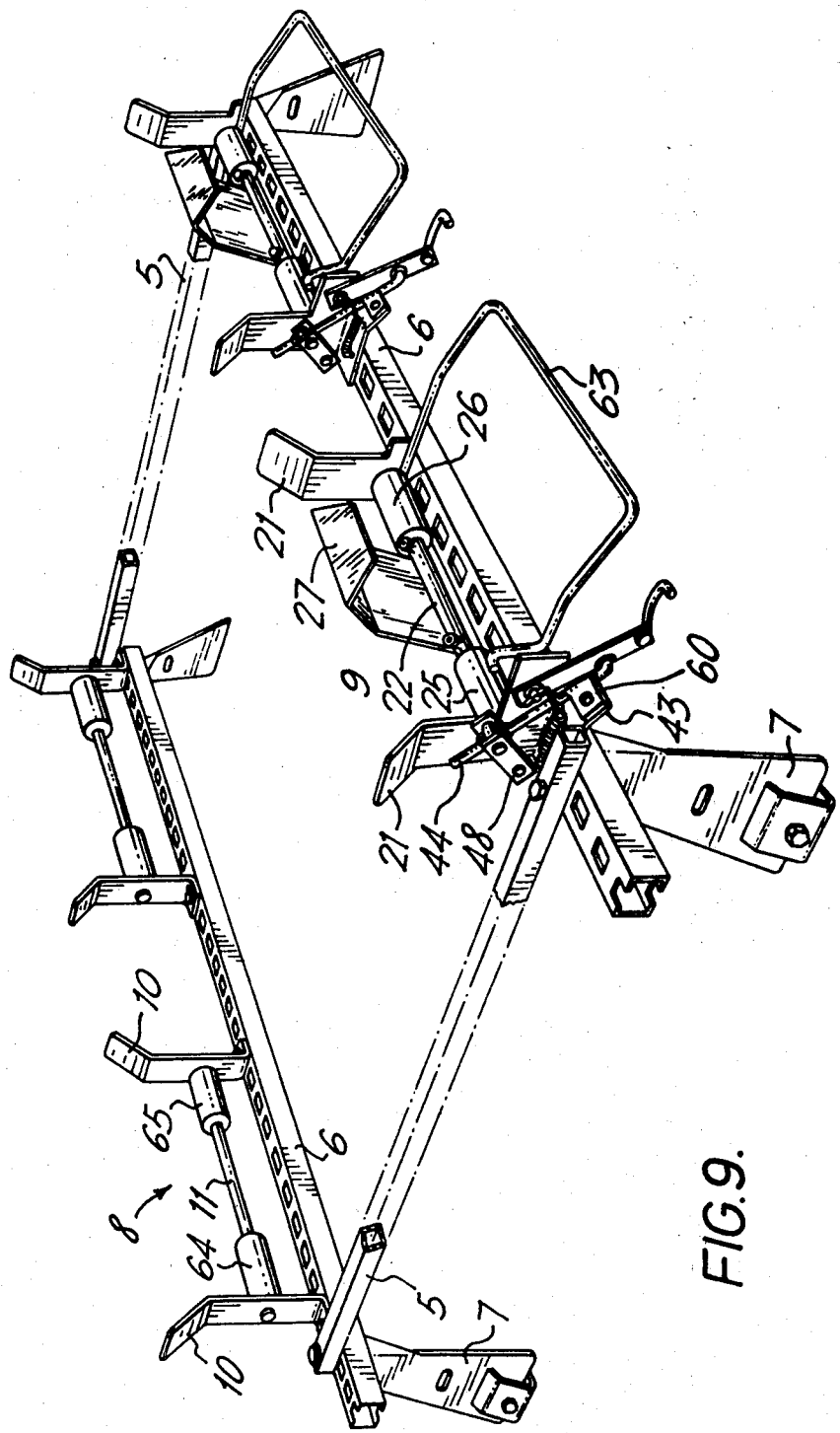
FIG. 9 is a perspective view of the third embodiment in the locked position.

FIGS. 8 and 9 show the locked and unlocked positions of a third embodiment of the invention. This third embodiment is basically a simplified version of the second embodiment of FIGS. 6 and 7, and similar reference numerals have been used for similar parts. The simplification consists in the fact that the front assembly 8 comprises only the pair of fixed rollers 64,65 mounted on the shaft 11, the bar 18, the roller support arms 12 and 13, and the rollers 15 and 16 on their shaft 14 all being omitted. Consequently the handle 31 and rod 35 are unnecessary, there now being no connection between the front and rear assemblies. The operation of the rear assembly 9 is however identical to that described in relation to the second embodiment, in particular as shown in FIGS. 10 and 11. It is to be noted that in the third embodiment the only ladder-retaining means is the single hooked plate 27 of the rear assembly 9.

In all the above embodiments it is to be understood that each pair of rollers on the same shaft, such as the rollers 15 and 16 on the shaft 14, may be replaced by a single roller extending along substantially the entire length of the shaft.

I claim:

1. A ladder rack for a vehicle roof comprising:
   a subframe having means for releasable attachment to the roof of a vehicle, and front and rear ladder support assemblies mounted on the subframe;
   each of the front and rear support assemblies comprising:
   at least one respective transverse roller for engaging under the stringers of a ladder spanning the two assemblies and at least one respective ladder-retaining member being manually pivotable about a respective transverse axis from a lowered inoperative position to a raised operative position wherein each said member is in a position to engage a rung of a ladder spanning the two assemblies;
   said at least one roller of the front assembly further being manually pivotable about a transverse axis for raising and lowering whereby a ladder spanning the assemblies may be brought into a downwardly and rearwardly inclined orientation for on and off loading from the rear of the vehicles.

2. A ladder rack according to claim 1, wherein a first handle is coupled to the said at least one ladder-retaining member by a spring-loaded linkage which is overcentred in the raised operative position of the said member so as to lock the latter in the operative position.

3. A ladder rack according to claim 2, wherein the rear support assembly comprises a second handle pivotally mounted at the opposite said one side of the rear ladder support assembly with respect to the first handle, the second handle being coupled by a second connecting rod to the front roller to effect the said raising and lowering thereof independently of the operation of the ladder-retaining members.

4. A ladder rack according to claim 1, wherein said at least one roller of the front assembly is manually pivotable independently of the operation of the said at least one ladder-retaining member of the rear assembly, whereby a ladder may be brought to said downwardly and rearwardly inclined position in preparation for off-loading while still being retained on the rack by said at least one ladder-retaining member of the rear assembly.

5. A ladder rack according to claim 4, wherein the front and rear ladder-retaining members are simultaneously pivotable by a common first handle, and the at least one roller of the front assembly is independently pivotable by a separate second handle.

6. A ladder rack according to claim 4, wherein the front and rear ladder-retaining members are independently pivotable by separate handles, and wherein the handle associated with the front ladder-retaining member is further coupled to the at least one roller of the front assembly in such manner that when the said roller is raised the front member is lowered and vice versa.

7. A ladder rack according to claim 6, wherein the front ladder-retaining member and the front roller are rigidly secured to a common axle.

8. A ladder rack according to claim 6 or 7, wherein the at least one ladder-retaining member of the rear assembly is in the form of a hook adapted to engage over a rung of a ladder.

9. A ladder rack according to claim 6 or 7, wherein the handle associated with the rear ladder-retaining member includes a spring-loaded linkage which is overcentred in the raised operative position of the said member so as to lock the latter in the operative position.

* * * * *